US010460700B1

(12) United States Patent
Mendhekar et al.

(10) Patent No.: US 10,460,700 B1
(45) Date of Patent: Oct. 29, 2019

(54) METHOD AND APPARATUS FOR IMPROVING QUALITY OF EXPERIENCE AND BANDWIDTH IN VIRTUAL REALITY STREAMING SYSTEMS

(71) Applicant: Cinova Media, Mountain View, CA (US)

(72) Inventors: Anurag Mendhekar, Mountain View, CA (US); Pierre Seigneurbieux, Mountain View, CA (US); Subhrendu Sarkar, Mountain View, CA (US); Domenico Guardini, Mountain View, CA (US)

(73) Assignee: Cinova Media, Redwood City, CA (US)

( * ) Notice: Subject to any disclaimer, the term of this patent is extended or adjusted under 35 U.S.C. 154(b) by 147 days.

(21) Appl. No.: 15/425,613

(22) Filed: Feb. 6, 2017

Related U.S. Application Data

(63) Continuation-in-part of application No. 15/291,953, filed on Oct. 12, 2016.

(60) Provisional application No. 62/240,442, filed on Oct. 12, 2015, provisional application No. 62/291,447, filed on Feb. 4, 2016.

(51) Int. Cl.
| | | |
|---|---|---|
| *G09G 5/00* | (2006.01) | |
| *H04L 29/06* | (2006.01) | |
| *H04L 12/26* | (2006.01) | |
| *H04L 27/26* | (2006.01) | |
| *G06T 7/20* | (2017.01) | |
| *G06K 9/00* | (2006.01) | |
| *G06T 3/40* | (2006.01) | |
| *G06T 19/00* | (2011.01) | |

(52) U.S. Cl.
CPC .......... *G09G 5/006* (2013.01); *G06K 9/00671* (2013.01); *G06T 3/4092* (2013.01); *G06T 7/20* (2013.01); *H04L 27/2607* (2013.01); *H04L 43/0852* (2013.01); *H04L 65/60* (2013.01); *G06T 19/006* (2013.01); *G06T 2200/16* (2013.01); *G09G 2370/022* (2013.01)

(58) Field of Classification Search
CPC ... G09G 5/006; G06K 9/00671; G06T 3/4092
See application file for complete search history.

(56) References Cited

U.S. PATENT DOCUMENTS

| | | | |
|---|---|---|---|
| 5,596,659 | A | 1/1997 | Normile et al. |
| 5,703,799 | A | 12/1997 | Ohta |
| 5,900,849 | A | 5/1999 | Gallery |
| 6,016,360 | A | 1/2000 | Nguyen et al. |

(Continued)

FOREIGN PATENT DOCUMENTS

| | | |
|---|---|---|
| JP | 2003-018412 | 1/2003 |
| JP | 2004-173205 | 6/2004 |

(Continued)

*Primary Examiner* — Barry Drennan
*Assistant Examiner* — Terrell M Robinson
(74) *Attorney, Agent, or Firm* — DLA Piper LLP (US)

(57) ABSTRACT

An apparatus and method for improving the quality of user experience and reducing bandwidth consumption in Virtual Reality systems that optimize bandwidth by restricting the transmitted stream to only what is in the field of view of a virtual reality headset are disclosed. The actual content streamed may vary from interactive games to pre-recorded or live video.

27 Claims, 10 Drawing Sheets

(56) References Cited

U.S. PATENT DOCUMENTS

| | | | |
|---|---|---|---|
| 6,052,205 | A | 4/2000 | Matsuura |
| 6,128,407 | A | 10/2000 | Inoue et al. |
| 6,304,295 | B1* | 10/2001 | Krishnamurthy .... H04N 19/503 348/420.1 |
| 6,393,156 | B1 | 5/2002 | Nguyen et al. |
| 6,463,178 | B1 | 10/2002 | Kondo et al. |
| 6,466,254 | B1 | 10/2002 | Furlan et al. |
| 6,625,221 | B2 | 9/2003 | Knee et al. |
| 6,690,731 | B1 | 2/2004 | Gough et al. |
| 6,697,521 | B2 | 2/2004 | Islam et al. |
| 6,715,003 | B1 | 3/2004 | Safai |
| 6,792,153 | B1 | 9/2004 | Tsujii |
| 6,938,073 | B2 | 8/2005 | Mendhekar et al. |
| 7,003,167 | B2 | 2/2006 | Mukherjee |
| 7,149,811 | B2 | 12/2006 | Wise et al. |
| 7,791,508 | B2 | 9/2010 | Wegener |
| 7,916,960 | B2 | 3/2011 | Mizuno |
| 7,965,900 | B2 | 6/2011 | Maurer et al. |
| 8,077,990 | B2 | 12/2011 | Islam |
| 8,130,828 | B2 | 3/2012 | Hsu et al. |
| 8,265,144 | B2 | 9/2012 | Christoffersen et al. |
| 8,422,804 | B2 | 4/2013 | Islam |
| 8,463,033 | B2 | 6/2013 | Islam |
| 8,639,057 | B1 | 1/2014 | Mendhekar et al. |
| 8,811,736 | B2 | 8/2014 | Islam |
| 9,042,644 | B2 | 5/2015 | Mendhekar et al. |
| 9,230,341 | B2 | 1/2016 | Islam |
| 2001/0031009 | A1 | 10/2001 | Knee et al. |
| 2001/0041011 | A1 | 11/2001 | Passagio et al. |
| 2001/0048770 | A1 | 12/2001 | Maeda |
| 2002/0108118 | A1 | 8/2002 | Cohen et al. |
| 2003/0002734 | A1 | 1/2003 | Islam et al. |
| 2003/0202579 | A1 | 10/2003 | Lin et al. |
| 2003/0202581 | A1 | 10/2003 | Koda Ma |
| 2003/0206590 | A1 | 11/2003 | Krishnamachari |
| 2004/0137886 | A1 | 7/2004 | Ross et al. |
| 2004/0264793 | A1 | 12/2004 | Okubo |
| 2005/0063599 | A1 | 3/2005 | Sato |
| 2006/0039473 | A1 | 2/2006 | Filippini et al. |
| 2006/0115166 | A1 | 6/2006 | Sung et al. |
| 2006/0177145 | A1* | 8/2006 | Lee .......................... G06K 9/40 382/255 |
| 2006/0285587 | A1 | 12/2006 | Luo et al. |
| 2007/0019875 | A1 | 1/2007 | Sung et al. |
| 2007/0206871 | A1 | 9/2007 | Jalil et al. |
| 2007/0237237 | A1 | 10/2007 | Chang et al. |
| 2007/0248163 | A1 | 10/2007 | Zuo et al. |
| 2008/0240239 | A1* | 10/2008 | Stuart ....................... G06T 9/20 375/240.12 |
| 2008/0247658 | A1 | 10/2008 | Lee et al. |
| 2010/0020868 | A1 | 1/2010 | Ayres, Jr. et al. |
| 2010/0066912 | A1 | 3/2010 | Kumwilaisak et al. |
| 2010/0266008 | A1 | 10/2010 | Reznik |
| 2010/0329358 | A1 | 12/2010 | Zhang et al. |
| 2011/0103445 | A1 | 5/2011 | Jax et al. |
| 2011/0200262 | A1 | 8/2011 | Canel-Katz et al. |
| 2011/0206287 | A1 | 8/2011 | Islam |
| 2011/0307685 | A1 | 12/2011 | Song |
| 2013/0072299 | A1 | 3/2013 | Lee |
| 2014/0133583 | A1 | 5/2014 | Lin et al. |
| 2014/0188451 | A1 | 7/2014 | Asahara et al. |
| 2014/0282736 | A1* | 9/2014 | Elstermann ............ H04N 21/84 725/50 |
| 2014/0306954 | A1* | 10/2014 | Kao ........................ G06T 17/00 345/420 |
| 2015/0055937 | A1 | 2/2015 | Van Hoff et al. |
| 2015/0348558 | A1* | 12/2015 | Riedmiller ............ G10L 19/167 704/500 |
| 2016/0073114 | A1 | 3/2016 | Kawamura et al. |
| 2016/0140733 | A1* | 5/2016 | Gu .......................... H04N 5/247 348/43 |
| 2016/0198140 | A1* | 7/2016 | Nadler .................... G06F 16/70 348/43 |

FOREIGN PATENT DOCUMENTS

| | | |
|---|---|---|
| JP | 2007-104645 | 4/2007 |
| JP | 2007-318711 | 12/2007 |
| KR | 2003-0007080 | 1/2003 |
| KR | 2010-0918377 | 9/2009 |
| WO | WO2003/103295 | 12/2003 |
| WO | WO 2006/061734 | 6/2006 |

* cited by examiner

METHOD AND APPARATUS FOR IMPROVING QUALITY OF EXPERIENCE AND BANDWIDTH IN VIRTUAL REALITY STREAMING SYSTEMS

PRIORITY CLAIMS/RELATED APPLICATIONS

This application is a continuation in part of and claims priority under 35 USC 120 to U.S. patent application Ser. No. 15/291,953, filed Oct. 12, 2016 and entitled "METHOD AND APPARATUS FOR OPTIMIZING VIDEO STREAMING FOR VIRTUAL REALITY" which in turn claims priority and the benefit under 35 USC 119(e) to U.S. Provisional Patent Application Ser. No. 62/240,442 filed on Oct. 12, 2015 and entitled "Method And Apparatus For Optimizing Video Streaming For Virtual Reality" and U.S. Provisional Patent Application Ser. No. 62/291,447 filed Feb. 4, 2016 and entitled "Method And Apparatus For Optimizing Video Streaming For Virtual Reality", the entirety of all of which are incorporated herein by reference.

FIELD

This disclosure relates to streaming virtual reality system and more specifically to an apparatus and method for improving the quality of user experience and reducing bandwidth consumption in streaming virtual reality systems that optimize bandwidth.

BACKGROUND

Virtual reality streaming systems are currently available, but require a very large amount of bandwidth in order to steam the virtual reality data to each virtual reality streaming system since each virtual reality streaming system has to have the virtual reality data sent to the virtual reality streaming system over a network or other communications path. Thus, it is desirable to be able to reduce the bandwidth required for each virtual reality streaming system. One of the ways of reducing bandwidth consumption in virtual reality (VR) video streaming systems is to restrict the stream to only provide high quality VR data for what is in the view of the headset (known as the viewport). These systems consist of a streaming server (herein called the "server") and a player that continuously plays the streamed video on a display device (such as a VR Headset, mobile phone with viewing accessory, or any other plain display device capable of displaying video or images—the hardware and software may be collectively known as a "headset"). In particular, the video is streamed over some network connection between the headset and the server. The high quality video stream itself is restricted to the view that the headset expects, and continuously changes based on the direction the headset is pointing at, trying to maintain a continuous synchronization between the headset and the server. This allows a viewer to experience VR video in a manner similar to what the viewer would experience had the video been playing locally (i.e., without a streaming server) on the headset.

The video stream itself is derived from full frames of a 360-degree video that are intended to be projected on a virtual sphere around the headset, with the headset at the center of this sphere. Only the part of the sphere that the headset is pointed at inside this sphere is what is visible inside the headset. In optimized systems, the video stream will contain only high quality video for the portion that is visible. The part of the frame that is visible is called "in-view" and the rest is referred to as "out-of-view"

Depending upon the specific streaming system, the options for streaming what is not in-view may be as follows:
1. Don't stream out of view
2. Stream out of view at a lower resolution
3. Stream a limited form of the out-of-view to cover emergency situations.
4. Project the out-of-view onto other geometric shapes to reduce the number of pixels occupied by them.

There may be other options, but they will all revolve around focusing the bandwidth consumption primarily on what is in-view. In such systems, the headset has to constantly send the server the position of the headset, including the direction that the headset is pointed. The server uses this information to calculate which part of the next frame will be the "in-view" and must be sent to the headset. However, even these systems still send more data than may be required by the virtual reality system and it is desirable to be able to further reduce the bandwidth of the virtual reality data that must be streamed to these systems.

DETAILED DESCRIPTION OF ONE OR MORE EMBODIMENTS

The disclosure is particularly applicable to a streaming virtual reality system that uses a headset and it is in this context that the disclosure will be described. It will be appreciated, however, that the system and method has greater utility since it may be used with any virtual reality streaming system that uses a device to display virtual reality data to the user.

Figure 1:
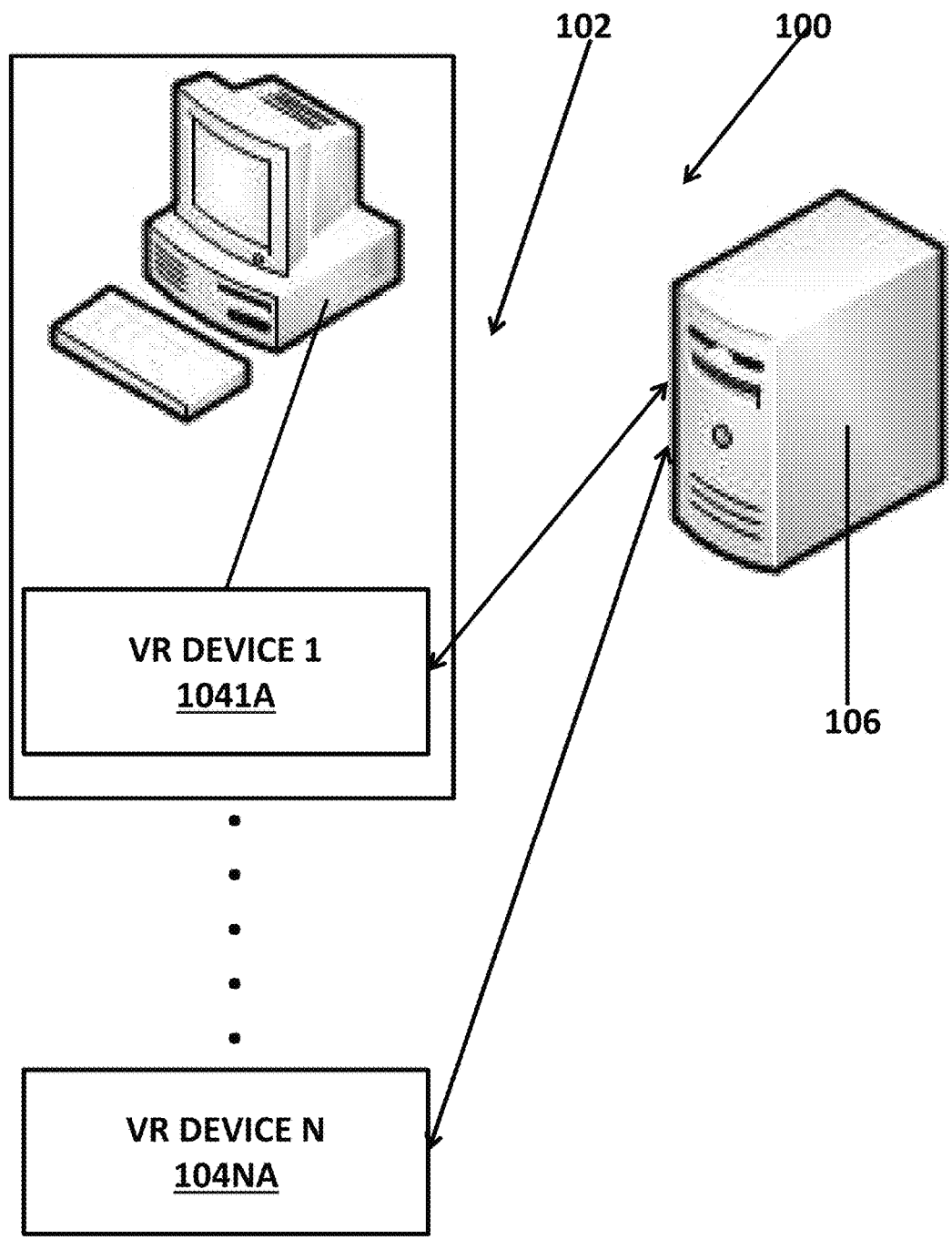
FIG. 1 illustrates a streaming virtual reality system having a plurality of virtual reality devices and a virtual reality data backend.

FIG. 1 illustrates a virtual reality system 100 having a plurality of virtual reality devices 102 and a virtual reality data backend 106 that are coupled together by a communications path. The communication path between each virtual reality device 102 and the backend 106 may be a wired or wireless network, a cellular data network, a wireless computer data network, an Ethernet or optical data connection and the like. The communications path between each virtual reality device 102 and the backend 106 may be different (or have different components) and thus the communications path between each virtual reality device 102 and the backend 106 may each have different network latency. In the streaming system, the backend 106 may receive data from each virtual reality device (including positioning/orientation data for the virtual reality device and/or network congestion data) and may generate optimized virtual reality data for each virtual reality data based on the data from each virtual reality device. The optimized virtual reality data may be optimized for each virtual reality device and may address known issues with streaming virtual reality devices and systems including head motion artifact issues and scene change issues described below.

Each virtual reality device 102 may be a device that is capable of receiving virtual reality streaming data, processing the virtual reality streaming data (including possibly decompressing that data) and displaying the virtual reality streaming data to a user using some type of virtual reality viewing device. Each virtual reality device may further directly deliver an immersive visual experience to the eyes of the user based on positional sensors of the virtual reality device that detects the position of the virtual reality device and affects the virtual reality data being displayed to the user. Each virtual reality device 102 may include at least a processor, memory, one or more sensors for detecting and generating data about a current position/orientation of the virtual reality device 102, such as an accelerometer, etc., and a display for displaying the virtual reality streaming data. For example, each virtual reality device 102 may be a virtual reality Headset, a computer having an attached virtual reality headset, a mobile phone with virtual reality viewing accessory or any other plain display device capable of displaying video or images. For example, each virtual reality device 102 may be a computing device, such as a smartphone, personal computer, laptop computer, tablet computer, etc. that has an attached virtual reality headset 104A1, or may be a self-contained virtual reality headset 104NA.

The system 100 may further comprise the backend 106 that may be implemented using computing resources, such as a server computer, a processor, memory, a blade server, a database server, an application server and/or various cloud computing resources. The backend 106 may also be implemented as a piece of hardware that has processing capabilities within the piece of hardware that perform the backend virtual reality data functions and operations described below. Generally, the backend 106 may receive a request for streamed virtual reality data for a virtual reality device (that may contain data about the virtual reality device), perform the technical task of virtual reality data preparation (using one or more rules or lines of instructions/computer code) to generate the stream of known in view and out of view virtual reality data as well as the one or more pieces of optimized virtual reality data (collectively the "optimized streamed virtual reality data") based on each request for streamed virtual reality data and stream that optimized streamed virtual reality data to each virtual reality device 102 that requested the virtual reality data. The optimized streamed virtual reality data is used to solve the technical problems of head motion artifact latency in streaming virtual reality data and a scene change issue in streaming virtual reality data.

Figure 2:
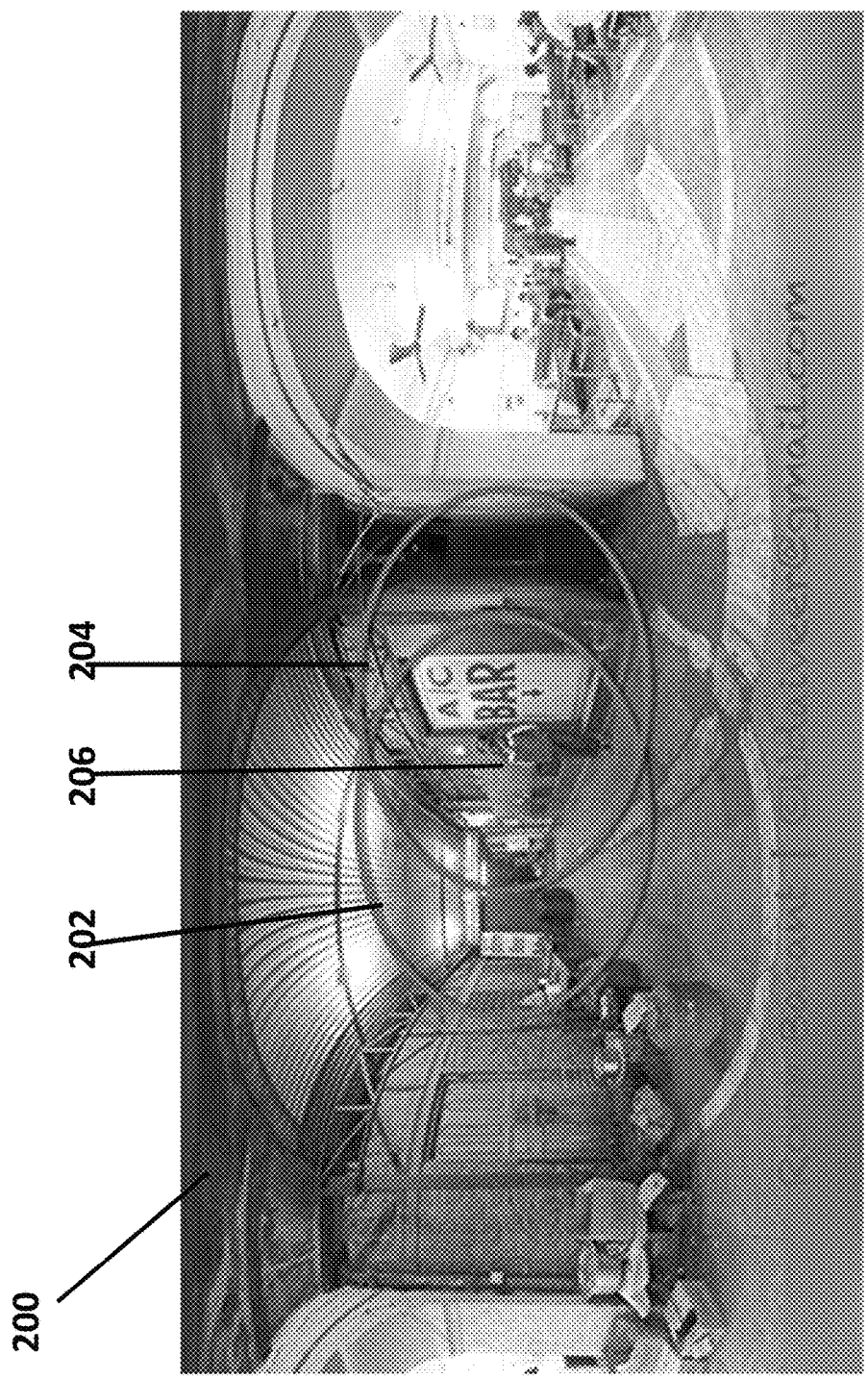
FIG. 2 illustrates an example of a frame of virtual reality data, a view of each eye of the virtual reality device and a viewport.

FIG. 2 illustrates an example of a frame of virtual reality data 200, a view of each eye of the virtual reality device 202, 204 and a viewport 206 (also known as an "in-view portion"). In a typical virtual reality streaming system, the virtual reality data may be a plurality of frames of virtual reality data that may be compressed using various compression processes such as MPEG or H.264 or H.265. For purposes of illustration, only a single frame is shown in FIG. 2, although it is understood that the processes described with reference to FIGS. 3 and 5 may be performed on each frame of virtual reality streaming data. In a virtual reality streaming data system, a viewer/user typically views this frame of virtual data (that is part of the virtual reality data video or virtual reality streamed data) using the virtual reality device 102 that plays back only a section of the whole frame/video based on the direction in which the virtual reality device 102 is pointed. As shown in FIG. 2, based on the direction/position of the virtual reality device, a certain portion of the frame, such as a left eye view portion 202 and a right eye portion 204 may be within the view of the user of the virtual reality device 102. For example, the virtual reality device may provide a viewport that has the left eye view portion 202, the right eye view portion 204 as shown by the overlapping ovals shown in FIG. 2 and a central region 206 that is displayed to both eyes of the user similar to how a human being's eyes operate so that the virtual reality system provides an immersive experience for the user. Depending upon the configuration of the virtual reality device, the field of view of the virtual reality device determines the specific portion of the frame that needs to be displayed to each eye of the user. As an example, a virtual reality device with a 90-degree horizontal and vertical field of view, will only display about $\frac{1}{4}^{th}$ of the frame in the horizontal direction and $\frac{1}{2}$ of the frame in the vertical direction.

Impact of Network Speed and Latency

In a streaming virtual reality data system, the virtual reality device 102 and backend 106 are coupled to each other and virtual reality data is streamed over the communication path/network between the backend 106 and each virtual reality 102 for display on the virtual reality device. Since the virtual reality device 102 and backend 106 may be connected through the network/communication path (as shown in FIG. 1) with non-zero latency, it is possible that the backend 106 may not have received a new position of the virtual reality device before the backend 106 has to send out the next in-view section of a frame of virtual reality data. In this instance, the viewer will now have to be shown the parts of the out-of-view that will fill up the frame but are not covered by the in-view. Depending upon how the out of view data is handled by the particular virtual reality device, the viewer may see blurring at the edges of the view or no image at all. This type of a distortion of the image may be known as a "head-motion artifact".

Depending upon the length of the latency delay in the network, head-motion artifacts may persist for a while until (if ever) the backend 106 has caught up with the virtual reality device position, leading to a lower quality of user experience due the blurred image or no image at all. This may be referred to a head motion artifact latency problem.

In the case of high communication path/network latency, another related problem that arises is that the contents of the field of view may change dramatically. For example, if the virtual reality device is moving very quickly and there are delays in the network, the backend 106 may find that the location of the in-view (view port) has changed dramatically between two frames. In such cases, video encoding can get disrupted because the amount of information required in the stream goes up dramatically. In video encoding, this is equivalent to what is referred to as a "Scene Change". Encoders respond to scene changes by temporarily changing the logic of encoding to more efficiently deal with this sudden burst of information. For some encoders, however, there is no automatic scene change detection. As a result, the video encoding is inefficient and consumes more bandwidth than is necessary. This may be referred to a scene change encoding problem.

Network Latency itself may depend upon many factors including:
1. Available network bandwidth and speed.
2. Type of network (wireless, wi-fi, ethernet, LTE etc.)
3. Type of virtual reality device headset (Tethered, Mobile, Wireless)
4. Network Congestion
5. Backend 106 Load Both the head motion artifact latency problem and the scene change encoding problem are directly impacted by network latency, but very rapid head rotation by a user wearing a virtual reality device can also trigger the scene change encoding problem even if network latency is low. These problems are technical problems with current virtual reality data streaming systems. The backend system 106, as discussed below, addresses both of these technical problems with a technical solution described below.

Figure 3:
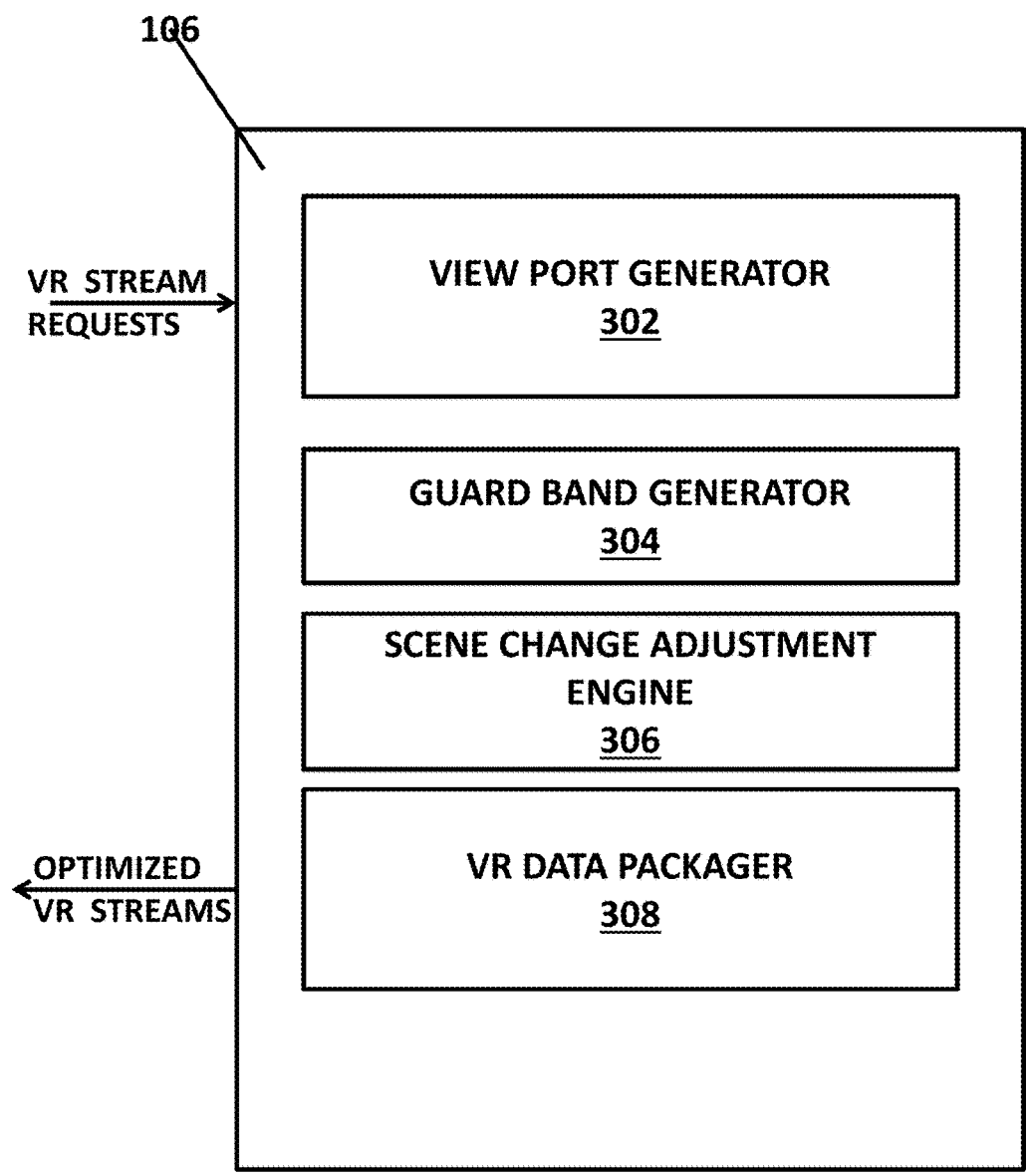
FIG. 3 illustrates more details of the virtual reality data backend that is part of the system shown in FIG. 1.

FIG. 3 illustrates more details of the virtual reality data backend 106 that is part of the system shown in FIG. 1. The virtual reality data backend 106 may be known as a virtual reality streaming data compression component/module/system that reduces the overall amount of virtual reality data (and hence reduces the bandwidth required for the virtual reality data) that has to be streamed to each virtual reality device 102 shown in FIG. 1. The virtual reality data backend 106 may receive a virtual reality (VR) data stream request from each virtual reality device 102 (that may include data about that virtual reality device as described above) and may generate an optimized VR stream that is sent back to each virtual reality device 102. Each optimized VR stream for each virtual reality device may include the in-view and out-of-view data and one or more pieces of optimized virtual reality data. The one or more pieces of optimized virtual reality data may include adaptive guard bands (as described below) that reduces the total amount of virtual reality data that is streamed to each virtual reality device 102 and/or a set of newly encoded virtual reality data that was encoded using new encoding parameters to address a scene change as described below.

The backend system 106 may further include a view port generator module/component 302, a guard band generator module/component 304, a scene change adjustment engine module/component 306 and a VR data packager module/component 308 that may be coupled to each other. Each of these modules/components 302-308 may be implemented in hardware or software. If a module is implemented in software, the module/component comprises a plurality of lines of computer code/instructions that may be executed by a processor of the backend system that perform a set of instructions/rules that perform the function and operation of that module as described below. If a module is implemented in hardware, the module may be a piece of hardware, such as a microcontroller, processor, programmed logic device, etc. that is programmed/manufactured so that the module performs the function and operation of that module as described below. The important aspects of these modules is the operations that these modules perform to reduce the total amount of virtual reality streaming data and the particular implementation of the modules using well known computer elements like a processor, server computer, etc. is not limiting to the disclosure or affect the important aspect of the system.

Figure 4:
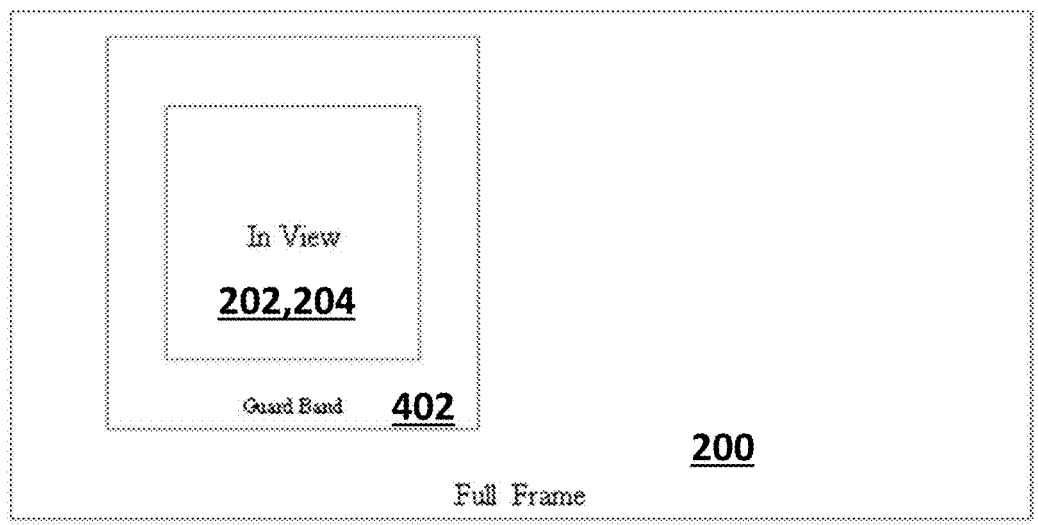
FIG. 4 illustrates a virtual reality viewport and a guard band in a virtual reality data frame.

The view port generator module/component 302 may determine a current viewport for each virtual reality device based on various data including sensor data from each virtual reality device that provides data about a position/orientation of the virtual reality device at a predetermined point in time. The view port generator module/component 302 may also determine the current viewport for the current frames of virtual reality data. For example, as shown in FIG. 4, a full frame of virtual reality data 200 may have the viewport (In View) 202,204 determined for each full frame of virtual reality data 200. The viewport generator module/component 302 may also receive the sensor data about the position/orientation of the virtual reality device at a predetermined point in time and predict the future position/orientation of the virtual reality device.

The guard band generator module/component 304 may receive the determined viewport from the view port generator module/component 302 and may generate a guard band 402 as shown in FIG. 4 that surrounds the view port/In View virtual reality data 202,204. The guard band may be a little bit of extra virtual reality data information that extends beyond the field of view of the virtual reality device as shown in FIG. 4. The amount of extra information sent is referred to as a "width" of the guard band. This means that when the user turns their head, the information that is displayed at the edges of the virtual reality device may be derived from the guard-band instead of the out-of-view data which is lower resolution. If the guard band is wide enough, this will effectively eliminate the head-rotation artifact. However, if too much data is being sent as part of the guard band, the head motion artifact latency problem may be solved at the expense of increased data being sent to each virtual reality device which thus increased the required bandwidth. In the system disclosed, the guard band generator module/component 304 may generate an adaptive guard band that has a width that may be variable in space as well as in time as discussed below in more detail using the methods shown in FIGS. 5-7. In particular, the guard band generator module/component 304 may determine an appropriate width of the guard band based on the predicted future position/orientation of the virtual reality device 102 in which the width may not be uniform around the viewport/In View 202, 204. This guard band with the appropriate width may be known as an adaptive guard band. The disclosed adaptive guard may reduce the head motion artifact latency problem as described above while also minimizing the bandwidth overhead/increase caused by the guard band.

The scene change adjustment engine 306 may receive data from the virtual reality data stream request from each virtual reality device and determine whether or not a scene change in the virtual reality data has occurred. If a scene change has occurred for a particular virtual reality device, the scene change adjustment engine 306 may adjust encoding parameters to handle the scene change that has occurred in the virtual reality data as described below in more detail with reference to FIG. 8.

Figure 9A:
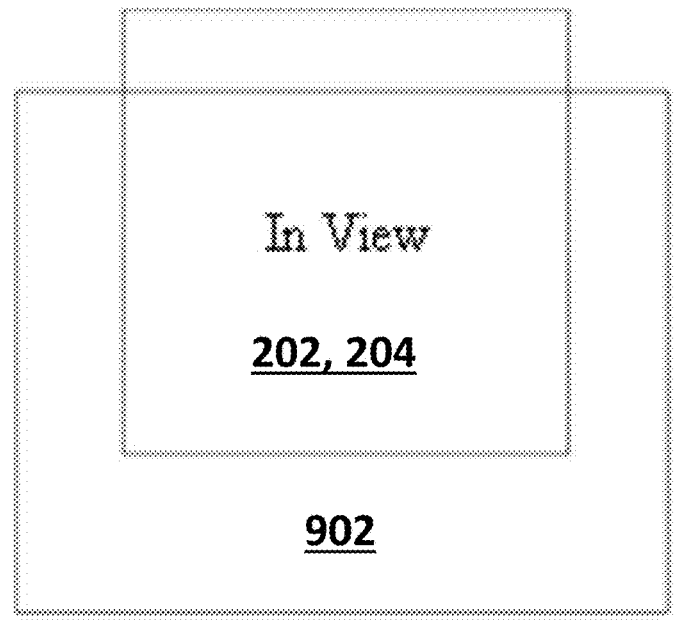
FIG. 9A-D illustrate examples of an adaptive guard band for virtual reality data.
Figure 9B:
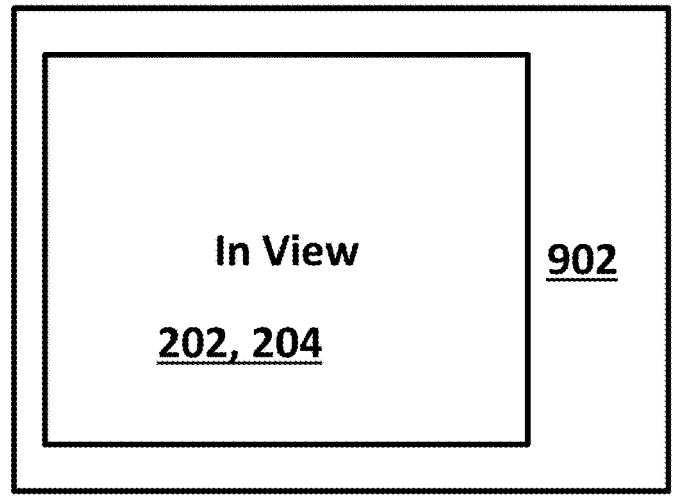
Figure 9C:
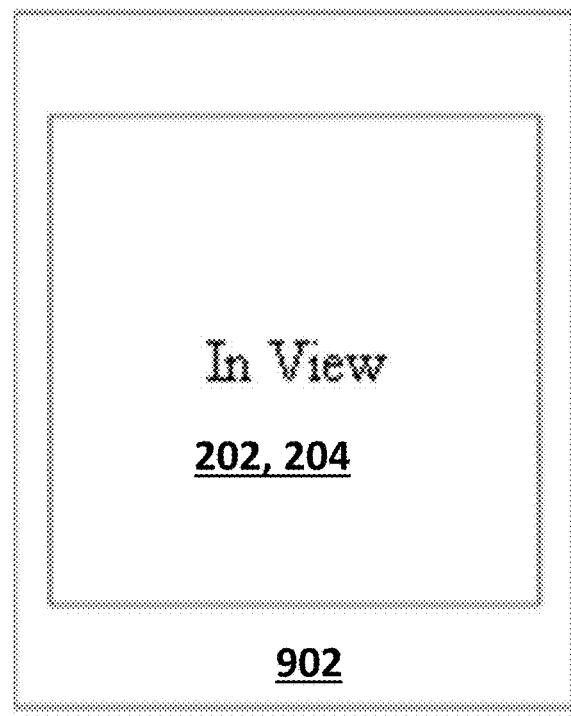

The VR data packager module/component 308 may package up/compress/encode the in-view virtual reality data, the out of view data and one or more pieces of optimized virtual reality data for each virtual reality device. The one or more pieces of optimized virtual reality data may include adaptive guard bands (as described below) that reduces the total amount of virtual reality data that is streamed to each virtual reality device 102 and/or a set of newly encoded virtual reality data that was encoded using new encoding parameters to address a scene change as described below. The VR data packager module/component 308 may communicate that package of streamed virtual reality data to each virtual reality device 102. Thus, the VR data packager module/component 308 may include a streaming virtual reality data encoder. The VR data packager module/component 306 may compress the out-of-view data more than the in-view virtual reality data in order to further reduce the bandwidth needed to stream the virtual reality data. The adaptive guard band data and the adjusted encoded data to handle the scene change may be collectively known as one or more pieces of optimized virtual reality data that may be sent to each virtual reality device. Note that the one or more pieces of optimized virtual reality data for each virtual reality device is generated for each individual virtual reality device so that the optimized virtual reality data is optimized for the particular virtual reality device and its situation. For example, one virtual reality device may have low network latency, the position of that virtual reality device is presently moving horizontally to the right and there is not a scene change presently so that the one or more pieces of optimized virtual reality data for that virtual reality device may be a narrow adaptive guard band that is shifted horizontally as shown in FIG. 9B and there may be no changed encoding parameters. An another example, a different virtual reality device may have low network latency, the position of that virtual reality device is presently moving vertically and there is a scene change presently detected in the virtual reality data so that the one or more pieces of optimized virtual reality data for that virtual reality device may be a narrow adaptive guard band that is shifted vertically as shown in FIG. 9C and the virtual reality data may contain adjusted encoded virtual reality data to handle the scene change.

Figure 5:
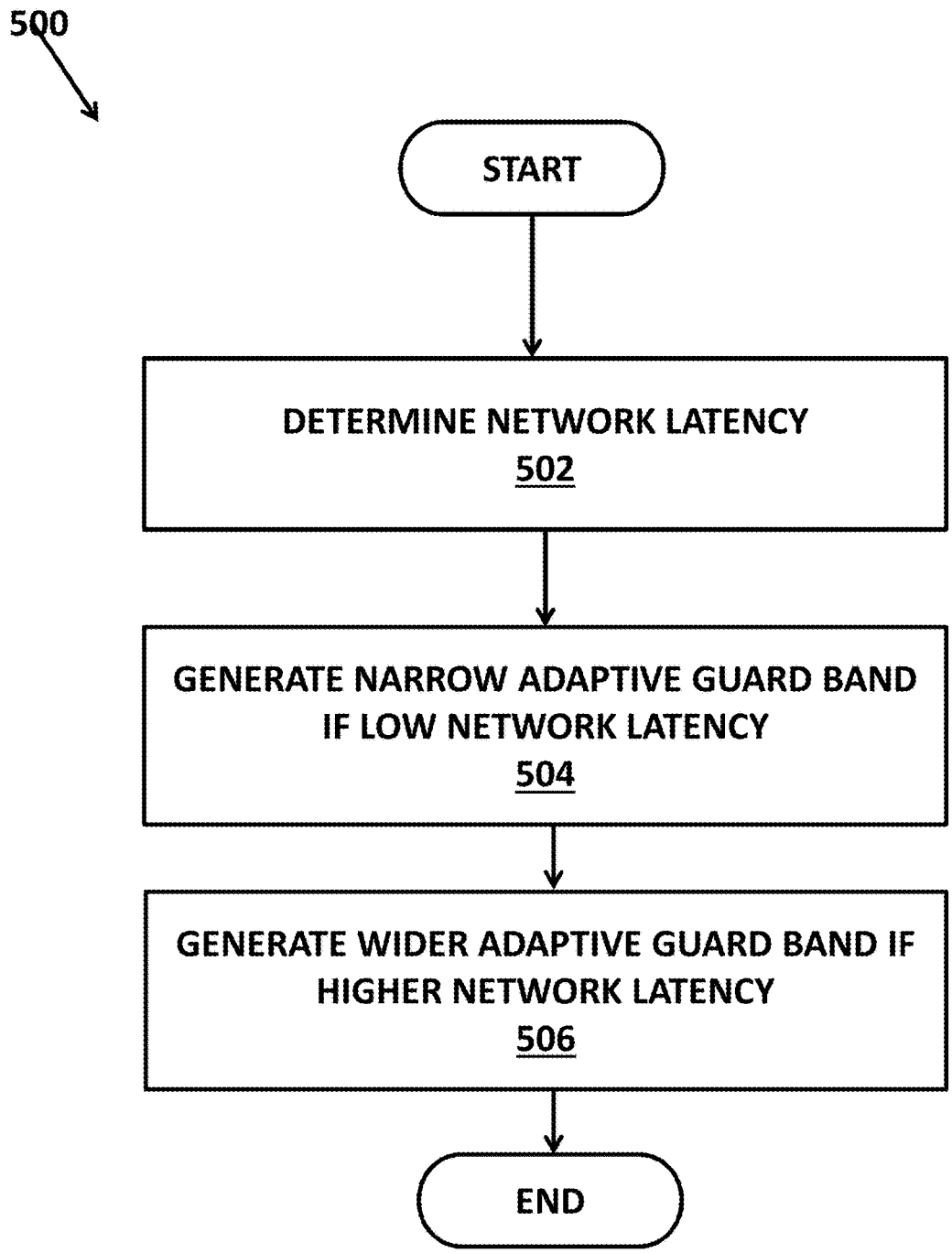
FIG. 5 illustrates a method for generating an adaptive guard band for virtual reality data based on network latency.

FIG. 5 illustrates a method 500 for generating an adaptive guard band for virtual reality data based on network latency. In this method, the adaptive guard band is adaptive in time based on a latency of the network/communication path. In this method, the adaptive guard band width may be adjusted depending upon network characteristics as listed below in the performance section. In one embodiment, the method 500 may be performed by the backend components (specifically the guard band generator 304 shown in FIG. 3) that may be implemented as an algorithm that is being executed by the guard band generator 304 to perform the processes below.

The system may be continuously tracking the performance of the network between the backend and the virtual reality device based not only on its own network performance data but it may also include network performance data sent back by each virtual reality device. Using this information, the backend 106 can quite reliably compute the network latency on an ongoing basis, and can predict with reasonable confidence the latency associated with the last position update that was received from each virtual reality device (502). Round trip latency data is recorded for each frame that is received by the player, and average bandwidth over a window of a few frames is also recorded continuously. Other data such as packet loss rate and number of dropped frames can also be recorded. Using this information, the optimal width of the guard band can be calculated. Round trip latency can vary by type of network, but we would consider normal latency to be in the order of 40-90 ms. At the lower end of this range, the guard band will be small (5-10% of frame width). If the network latency increases by 5%, the guard band can be extended by a few percent, provided the overall bandwidth remains the same. However, if the overall bandwidth has also reduced, then extending the guardband may have deleterious effect to the experience. Typically guardbands are about 5%-25% of the width of the frame.

Once the network latency is determined, an adaptive guard band may be generated that accounts for the determined network latency. For example, if the network latency is very low, such as in the 40 ms range, the method may generate a narrow guard band (504). Since the network latency is low, it is less likely that a head motion artifact latency problem will occur since the backend 106 is getting timely data from each virtual reality device 102 so that a narrower guard band may be used that results in less data that needs to be sent to a particular virtual reality device for the guard band. If the network latency is high, such as more than a 100 ms, the method may generate a wider guard band (506), to the extent the available bandwidth allows. Since the network latency is higher, it is more likely that a head motion artifact latency problem will occur since the backend 106 is not getting timely data from each virtual reality device 102 due to the latency so that a wider guard band may be used. In addition to the communication path characteristics mentioned above, the method may also use other information, such as network bandwidth, type of network, type of headset etc., to generate/pick the initial width of the guard band and may then a continuously computed latency may be used to vary the size of the adaptive guard band.

Figure 6:
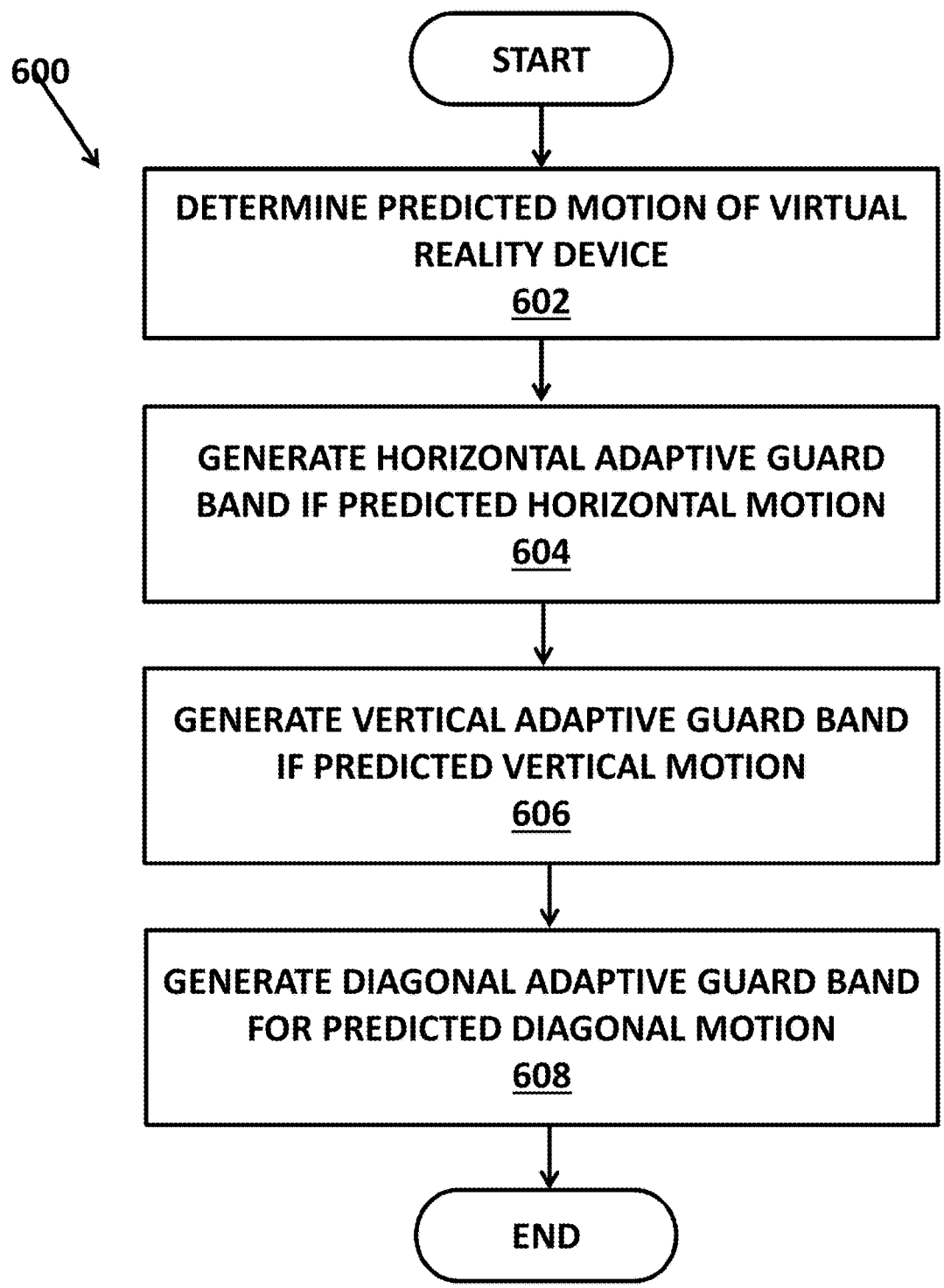
FIG. 6 illustrates a method for generating an adaptive guard band for virtual reality data based on motion of the virtual reality device.

FIG. 6 illustrates a method 600 for generating an adaptive guard band for virtual reality data based on motion of the virtual reality device. In this method, the adaptive guard band may be adaptive in space based on motion. In one embodiment, the method 600 may be performed by the backend components (specifically the guard band generator 304 shown in FIG. 3) that may be implemented as an algorithm that is being executed by the guard band generator 304 to perform the processes below.

In the streaming virtual reality system, each virtual reality device 102 may have one or more sensors that measure the motion/position/orientation of each virtual reality device 102 and each virtual reality device 102 may communicate virtual reality device motion/position/orientation information to the backend 106. In some embodiments, each virtual reality headset may continuously transmit virtual reality device motion/position/orientation information to the backend 106 so that the backend 106 and the guard band generator 304 has a full record of the type of motion that is associated with a particular VR video. Thus, if the same VR video is streamed repeatedly to multiple users/virtual reality devices, the backend 106 and the guard band generator 304 have a rich collection of data stored in the backend that will allow the backend 106 and the guard band generator 304 to predict with reasonable confidence the type of motion the user/virtual reality device will be going through (602). For example, in relatively calm scenes, the users will have a slower head movement in a given direction and in high motion scenes, the users may follow the motion of a certain object (e.g., in a tennis match the users will follow the motion of a ball). The direction of motion also may have particular statistical properties. For example, there may be more rotation in the horizontal direction rather than vertical direction (again, think of the tennis match). In the method, if there is no prior data about the particular video, the system and method uses position data from the virtual reality device to make initial predictions. As the particular video is played repeatedly, these predictions are improved.

Figure 9D:
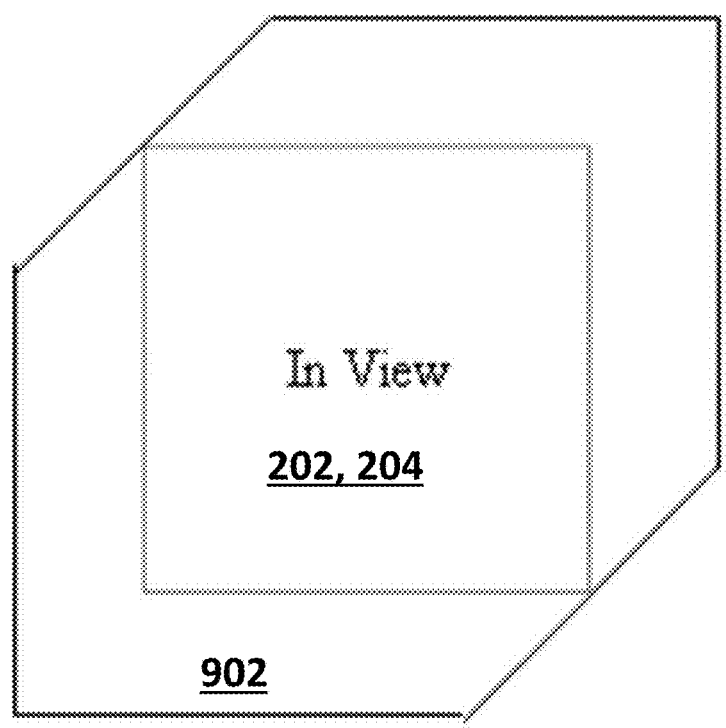

The method then uses the predicted motion properties to determine the width of a guard band in a given direction. For example, if the motion is mostly horizontal (such as watching a tennis match for example), then the guard band may be optimized to be wider in the horizontal direction rather than the vertical direction (604). An example of such as a horizontally optimized guard band is shown in FIG. 9B in which the predicted motion is right. If the predicted horizontal motion is left, then the adaptive guard band width will be wider on the left side. For example, if the motion is mostly vertical (such as watching a bouncing ball for example), then the guard band may be optimized to be wider in the vertical direction rather than the horizontal direction (606). An example of such as a vertically optimized guard band is shown in FIGS. 9A (adaptive guard band optimized for downward vertical motion) and 9C (adaptive guard band optimized for upwards and downwards vertical motion). For example, if the motion is mostly left to right diagonal, such as for example a ball falling from the higher left side of the viewer to the lower right of the viewer, then the guard band may be optimized to be wider in the right diagonal direction (608). An example of such as a diagonal motion optimized guard band is shown in FIG. 9D. If the diagonal motion is right to left, then the adaptive guard band width will be wider in the left diagonal direction. In addition to these simple examples of motion above, the method may also generate an adaptive guard band that has a wider portion in several different sides due to the more complicated predicted motion of the virtual reality device. For example, when viewing sports, the viewer is often following thea ball amongst many players, the motion of the ball can take a few seconds, which can be comfortably predicted based on motion data and prior views. This information can be used to generate wider guard bands specifically in the direction of motion of the ball, while generating narrower guard bands against the direction of the ball. In a game like tennis, these guard bands will alternate direction as the ball moves from one side of the court to another.

Figure 7:
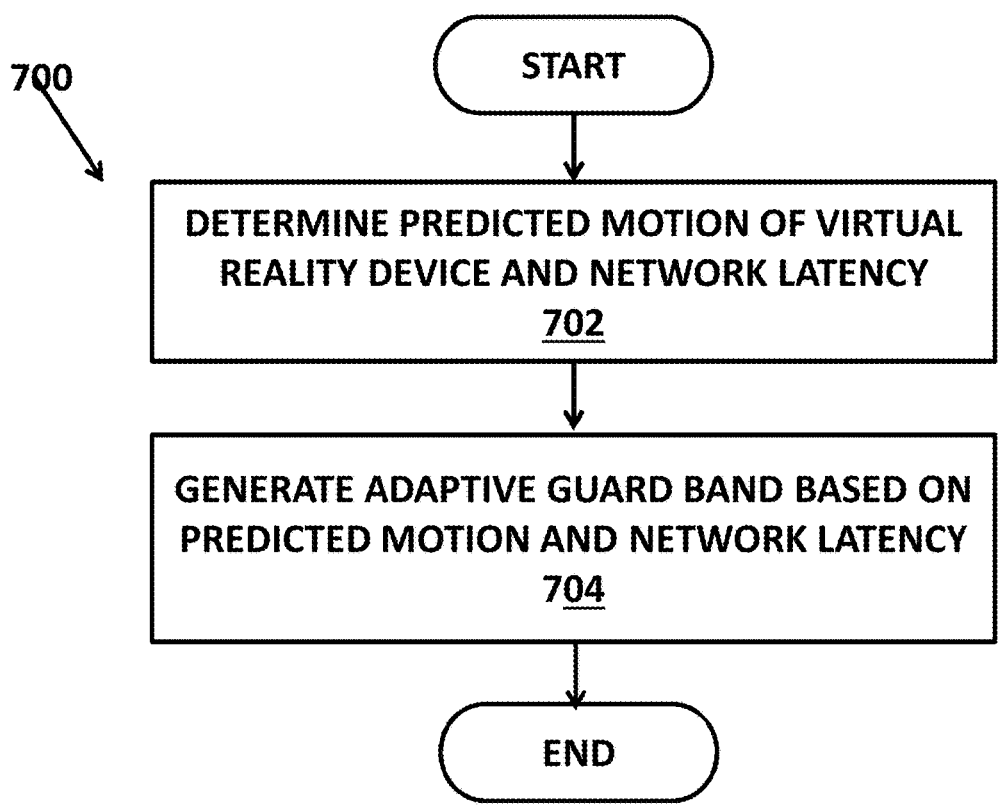
FIG. 7 illustrates a method for generating an adaptive guard band for virtual reality data based on motion of the virtual reality device and network latency.

FIG. 7 illustrates a method 700 for generating an adaptive guard band for virtual reality data based on motion of the virtual reality device and network latency. In one embodiment, the method 700 may be performed by the backend components (specifically the guard band generator 304 shown in FIG. 3) that may be an algorithm that is being executed by the guard band generator 304 to perform the processes below. In the method, the predicted motion of the virtual reality device (as described above) and network latency (as described above) may be determined (702). In this method, an adaptive guard band that is optimized for both the prediction motion of the virtual reality device and the network latency may be generated (704). For example, if a particular virtual reality device is predicted to move horizontally right and there is high latency of the communication path between the particular virtual reality device 102 and the backend 106, the method may generate an adaptive guard band that 902 has a wider portion on a right side of the guard band (as shown in FIG. 9B), but the width of the guard band on the right side may be slightly narrower due to the low latency. In this method, both of the motion of each virtual reality device 102 and the network latency between the each virtual reality device 102 is used to generate the adaptive guard band. Each of the above methods shown in FIGS. 5-7 address the head motion artifact latency problem while minimizing the overhead associated with the guard band.

Figure 8:
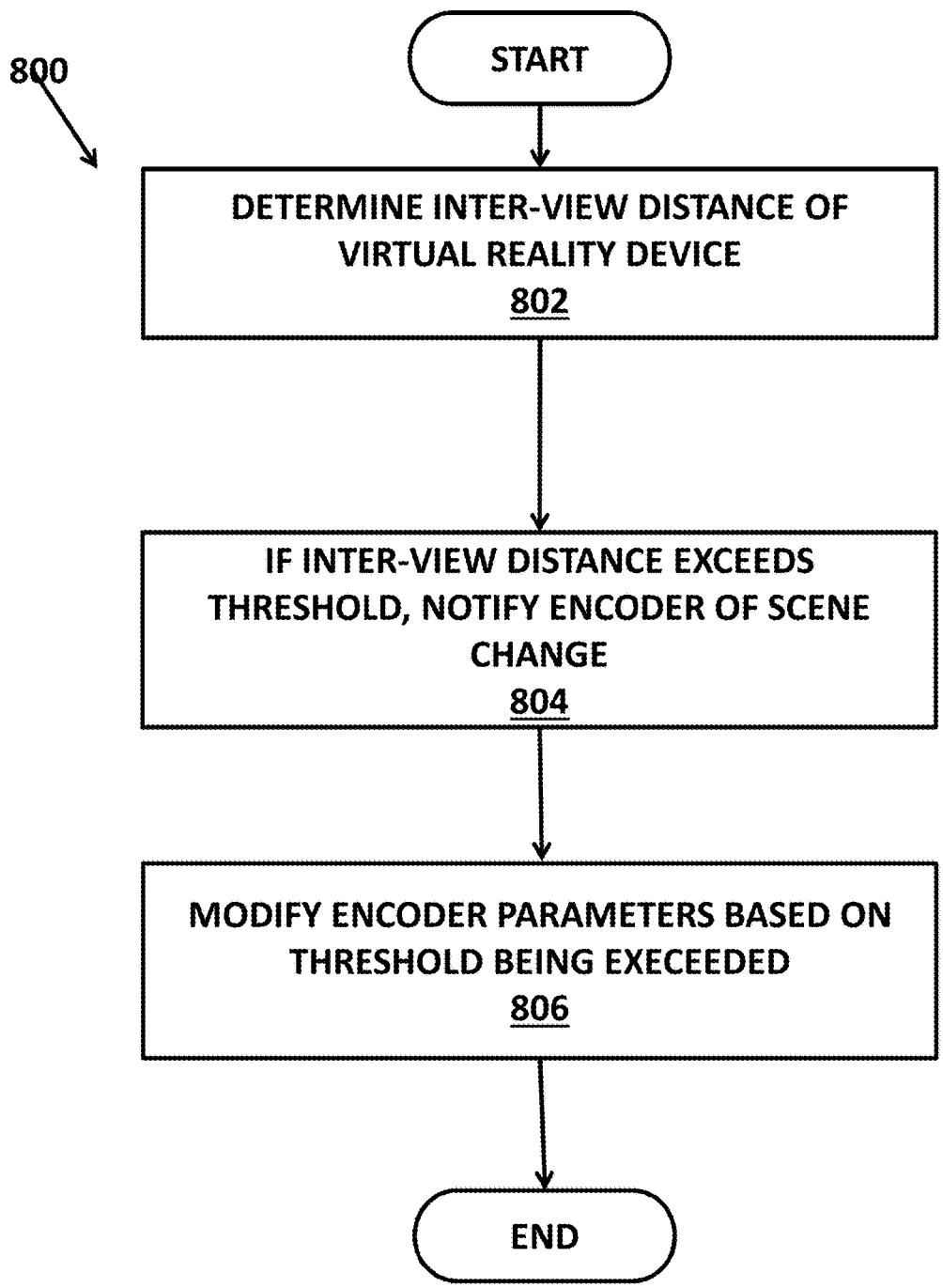
FIG. 8 illustrates a method for overcoming a scene change in virtual reality data.

FIG. 8 illustrates a method 800 for overcoming a scene change in virtual reality data. In one embodiment, the method 800 may be performed by the backend components (specifically the scene change adjustment engine 306 shown in FIG. 3) that may be an algorithm that is being executed by the guard band generator 306 to perform the processes below. In this method, a detected motion of the each virtual reality device based on the data from each virtual reality device may be determined. When a particular virtual reality device 102 undergoes a very large motion, or due to network problems, some of the intermediate positions from the particular virtual reality device 102 have arrived late to the backend 106, the next in-view data that needs to be streamed to particular virtual reality device 102 may have a significant displacement from the previous in-view data. As described above, this significant displacement can disrupt the encoding efficiency of the stream by injecting too much information into the stream.

The method may determine a distance between the position of the previous in-view and the next in-view (called the inter-view distance) for each virtual reality device (802) to notify the encoder of a "scene change" so that encoding parameters may be modified to anticipate a burst of new information so that the resulting in-view can be encoded more efficiently and with less "burstiness". In one embodiment, the method may compare the inter-view distance to a threshold and notify the encoder that a scene change occurred (804). The inter-view distance is typically determined using quaternions which individually represent the center position of each in-view and the difference between the quaternions comprises the inter-view distance. If the inter-view distance does not exceed the threshold, no scene change modification to the encoder is needed.

If the encoder is notified of a scene change, the encoding parameters may be explicitly modified (806). For example, when the inter-view distance crosses the threshold, the encoder could be explicitly asked to use an I-frame, or a higher percentage of Intra macroblocks when encoding the next few in-views, or other scene-change based view encoding optimizations. Other encoding parameters such as bitrate and quantization may also be modified.

The system and method provide a technical solution to the technical problem of bandwidth issues for virtual reality streaming data systems and applications. The system and method is a virtual reality streaming data compression system, implemented on a computing resource like a server computer, that has rules and software that generate an adaptive guard band that is a solution to the virtual reality bandwidth technical problem since the system and method send less virtual reality streaming data to each virtual reality system due to the adaptive guard bands generated by the system and method.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A virtual reality data apparatus, comprising:
   a backend system coupled to each virtual reality device over a communication path that streams virtual reality data to each virtual reality device, each virtual reality device receiving a virtual reality data stream that has an in view portion of a frame of virtual reality data and one or more pieces of optimized virtual reality data, the one or more pieces of optimized virtual reality data that is an adaptive guard band that surrounds the in view portion of the frame, the adaptive guard band having a width that is not uniform around each side of the in view portion of the frame for reducing an amount of virtual reality data being streamed to each virtual reality device while addressing a head motion artifact latency issue and a scene change issue of streaming virtual reality data;
   the backend system having an adaptive guard band component for receiving data about each virtual reality device, determining a motion of each virtual reality device and generating one or more pieces of optimized virtual reality data for each virtual reality device in response to the data about each virtual reality device and the detected motion of the virtual reality device; and
   wherein the adaptive guard band component is configured to generate an adaptive guard band for a particular virtual reality device having a wider width in a diagonal direction if the determined motion of the particular virtual reality device is diagonal.

2. The apparatus of claim 1, wherein the backend system is further configured to determine a latency of the communication path between the backend system and each virtual reality device and wherein the adaptive guard band component is configured to generate the adaptive guard band for each virtual reality device in response to the detected latency of the communication path between the backend system and each virtual reality device.

3. The apparatus of claim 2, wherein the adaptive guard band component is configured to generate an adaptive guard band for a particular virtual reality device having a narrow width if the detected latency for the communication path between the particular virtual reality device and the backend system is low.

4. The apparatus of claim 2, wherein the adaptive guard band component is configured to generate an adaptive guard band for a particular virtual reality device having a wide width if the detected latency for the communication path between the particular virtual reality device and the backend system is high.

5. The apparatus of claim 1, wherein the adaptive guard band component is configured to generate an adaptive guard band for a particular virtual reality device having a wider width in a horizontal direction if the determined motion of the particular virtual reality device is horizontal.

6. The apparatus of claim 1, wherein the adaptive guard band component is configured to generate an adaptive guard band for a particular virtual reality device having a wider width in a vertical direction if the determined motion of the particular virtual reality device is vertical.

7. The apparatus of claim 1, wherein the backend system is further configured to determine a motion of each virtual reality device and determine a latency of the communication path between the backend system and each virtual reality device and wherein the adaptive guard band component is configured to generate the adaptive guard band for each virtual reality device in response to the detected motion of the virtual reality device and the detected latency of the communication path between the backend system and each virtual reality device.

8. The apparatus of claim 1, wherein the backend system further comprises a scene change component that is configured to adjust a set of encoding parameters when a scene change is detected.

9. The apparatus of claim 8, wherein the scene change component is configured to determine an inter-view distance for a particular virtual reality device and detect the scene change when the inter-view distance for the particular virtual reality device exceeds a threshold.

10. A method, comprising:
    receiving data about a plurality of virtual reality devices;
    generating one or more pieces of optimized virtual reality data for each virtual reality device in response to the data about each virtual reality device, wherein the one or more pieces of optimized data is an adaptive guard band that surrounds the in view portion of the frame, the adaptive guard band having a width that is not uniform around each side of the in view portion of the frame;
    determining a motion of each virtual reality device;
    wherein generating the adaptive guard band further comprises generating the adaptive guard band for the virtual reality device in response to the detected motion of the virtual reality device and generating the adaptive guard band for a particular virtual reality device having a wider width in a diagonal direction if the determined motion of the particular virtual reality device is diagonal; and
    generating a virtual reality stream for the virtual reality device, the virtual reality stream having an in view portion of a frame of virtual reality data and the one or more pieces of optimized virtual reality data, the one or more pieces of optimized virtual reality data reducing an amount of virtual reality data being streamed to each virtual reality device while addressing a head motion artifact latency issue and a scene change issue of streaming virtual reality data.

11. The method of claim 10 further comprising determining a latency of the communication path between the backend system and each virtual reality device and wherein generating the adaptive guard band further comprises generating the adaptive guard band for the virtual reality device in response to the detected latency of the communication path between the backend system and each virtual reality device.

12. The method of claim 11, wherein generating the adaptive guard band further comprises generating the adaptive guard band for a particular virtual reality device having a narrow width if the detected latency for the communication path between the particular virtual reality device and the backend system is low.

13. The method of claim 11, wherein generating the adaptive guard band further comprises generating the adaptive guard band for a particular virtual reality device having a wide width if the detected latency for the communication path between the particular virtual reality device and the backend system is high.

14. The method of claim 10, wherein generating the adaptive guard band further comprises generating the adaptive guard band for a particular virtual reality device having a wider width in a horizontal direction if the determined motion of the particular virtual reality device is horizontal.

15. The method of claim 10, wherein generating the adaptive guard band further comprises generating the adaptive guard band for a particular virtual reality device having a wider width in a vertical direction if the determined motion of the particular virtual reality device is vertical.

16. The method of claim 10 further comprising determining a motion of each virtual reality device and determining latency of the communication path between the backend system and each virtual reality device and wherein generating the adaptive guard band further comprises generating the adaptive guard band for the virtual reality device in response to the detected motion of the virtual reality device and the detected latency of the communication path between the backend system and each virtual reality device.

17. The method of claim 10 further comprises adjusting a set of encoding parameters when a scene change is detected, encoding the in view portion of the virtual reality data using the adjusted set of if encoding parameters and communicating the encoded in view portion of the virtual reality data to the virtual reality device.

18. The method of claim 17 further comprising determining an inter-view distance for a particular virtual reality device and detecting the scene change when the inter-view distance for the particular virtual reality device exceeds a threshold.

19. A virtual reality system, comprising:
one or more virtual reality devices wherein each virtual reality device is capable of receiving streaming virtual reality data and is capable to displaying the virtual reality data to a user who is wearing the virtual reality device;
a backend system coupled to each virtual reality device over a communication path that streams virtual reality data to each virtual reality device, each virtual reality device receiving a virtual reality data stream that has an in view portion of a frame of virtual reality data and one or more pieces of optimized virtual reality data, the one or more pieces of optimized virtual reality data being an adaptive guard band that surrounds the in view portion of the frame, the adaptive guard band having a width that is not uniform around each side of the in view portion of the frame for reducing an amount of virtual reality data being streamed to each virtual reality device while addressing a head motion artifact latency issue and a scene change issue of streaming virtual reality data;
the backend system receiving data about each virtual reality device, determining a motion of each virtual reality device and generating one or more pieces of optimized virtual reality data for each virtual reality device in response to the data about each virtual reality device and the detected motion of the virtual reality device; and
wherein the backend system generates an adaptive guard band for a particular virtual reality device having a wider width in a diagonal direction if the determined motion of the particular virtual reality device is diagonal.

20. The system of claim 19, wherein the backend system is further configured to determine a latency of the communication path between the backend system and each virtual reality device and wherein the adaptive guard band component is configured to generate the adaptive guard band for each virtual reality device in response to the detected latency of the communication path between the backend system and each virtual reality device.

21. The system of claim 20, wherein the adaptive guard band component is configured to generate an adaptive guard band for a particular virtual reality device having a narrow width if the detected latency for the communication path between the particular virtual reality device and the backend system is low.

22. The system of claim 20, wherein the adaptive guard band component is configured to generate an adaptive guard band for a particular virtual reality device having a wide width if the detected latency for the communication path between the particular virtual reality device and the backend system is high.

23. The system of claim 19, wherein the adaptive guard band component is configured to generate an adaptive guard band for a particular virtual reality device having a wider width in a horizontal direction if the determined motion of the particular virtual reality device is horizontal.

24. The system of claim 19, wherein the adaptive guard band component is configured to generate an adaptive guard band for a particular virtual reality device having a wider width in a vertical direction if the determined motion of the particular virtual reality device is vertical.

25. The system of claim 19, wherein the backend system is further configured to determine a motion of each virtual reality device and determine a latency of the communication path between the backend system and each virtual reality device and wherein the adaptive guard band component is configured to generate the adaptive guard band for each virtual reality device in response to the detected motion of the virtual reality device and the detected latency of the communication path between the backend system and each virtual reality device.

26. The system of claim 19, wherein the backend system further comprises a scene change component that is configured to adjust a set of encoding parameters when a scene change is detected.

27. The system of claim 26, wherein the scene change component is configured to determine an inter-view distance for a particular virtual reality device and detect the scene change when the inter-view distance for the particular virtual reality device exceeds a threshold.

* * * * *